(12) United States Patent
Goldston et al.

(10) Patent No.: US 6,400,758 B1
(45) Date of Patent: Jun. 4, 2002

(54) METHOD AND APPARATUS FOR TRAINING SEQUENCE IDENTIFICATION IN AN AM COMPATIBLE DIGITAL AUDIO BROADCASTING SYSTEM

(75) Inventors: Don Roy Goldston, Mason; Marcus Matherne, West Chester, both of OH (US)

(73) Assignee: Ibiquity Digital Corporation, Columbia, MD (US)

( * ) Notice: Subject to any disclaimer, the term of this patent is extended or adjusted under 35 U.S.C. 154(b) by 0 days.

(21) Appl. No.: 09/339,745

(22) Filed: Jun. 24, 1999

(51) Int. Cl.[7] ................................ H04L 7/04
(52) U.S. Cl. .................. 375/216; 375/342; 375/364; 375/368; 370/514; 370/522
(58) Field of Search ................ 375/216, 260, 375/342, 364, 368; 370/514, 522

(56) References Cited

U.S. PATENT DOCUMENTS

| | | | |
|---|---|---|---|
| 5,559,830 A | 9/1996 | Dapper et al. | 375/230 |
| 5,588,022 A | 12/1996 | Dapper et al. | 375/216 |
| 5,606,576 A | 2/1997 | Dapper et al. | 375/268 |
| 5,633,896 A | 5/1997 | Carlin et al. | 375/340 |
| 5,652,772 A | 7/1997 | Isaksson et al. | 375/367 |
| 5,673,292 A | 9/1997 | Carlin | 375/269 |
| 5,703,954 A | 12/1997 | Dapper et al. | 381/15 |
| 5,732,113 A | 3/1998 | Schmidl et al. | 375/355 |
| 5,751,774 A * | 5/1998 | Wang | 375/367 |
| 5,761,190 A * | 6/1998 | Yamauchi et al. | 370/210 |
| 5,764,706 A | 6/1998 | Carlin et al. | 375/326 |
| 5,809,065 A | 9/1998 | Dapper et al. | 375/216 |
| 5,859,876 A | 1/1999 | Dapper et al. | 375/295 |
| 5,949,796 A | 9/1999 | Kumar | |
| 6,298,035 B1 * | 10/2001 | Heiskala | 370/206 |
| 6,307,892 B1 * | 10/2001 | Jones et al. | 375/296 |

OTHER PUBLICATIONS

Kroeger, B., Vigil, A., "Improved IBOC DAB Technology For AM and FM Broadcasting", Oct. 1996.
M. Alard, R. Lassale, "Principles of modulation and channel coding for digital broadcasting for mobile receivers", EBU Review, No. 224, pp. 168–190, Aug. 1987.
Kroeger, B.W., Peyla, P.J., "Robust IBOC DAB AM and FM Technology For Digital Audio Broadcasting", Apr. 1997.
Hartup, D. C., Alley, D. M., Goldston, D. R., "AM Hybrid IBOC DAB System", Sep. 1997.

* cited by examiner

*Primary Examiner*—Amanda T. Le
(74) *Attorney, Agent, or Firm*—Robert P. Lenart; Pietragallo, Bosick & Gordon (57) ABSTRACT

A method is provided for identifying a training baud in a digital audio broadcasting signal. The method includes the steps of receiving a plurality of carrier signals modulated by a plurality of data baud, wherein the data baud include normal baud and training baud. The data baud received on the carriers are compared with predetermined data signals to produce a plurality of difference signals. The difference signals are then used to produce a plurality of distance signals, which are combined to produce group distance signals. One of the group distance signals is selected and used to determine if the data baud corresponding to the selected group distance signal is a training baud or a normal baud. This determination is performed by storing successive selected group distance signals until at least one training baud has been received, and using the stored group distance signals to determine normal/training synchronization. The group distance signals correspond to data baud on predetermined groups of the carriers. Radio frequency receivers that utilize the above method are also disclosed.

18 Claims, 5 Drawing Sheets

METHOD AND APPARATUS FOR TRAINING SEQUENCE IDENTIFICATION IN AN AM COMPATIBLE DIGITAL AUDIO BROADCASTING SYSTEM

BACKGROUND OF THE INVENTION

This invention relates to signal processing and, more particularly, to methods of and apparatus for identifying training sequence information in a digital audio broadcasting signal.

There has been increasing interest in the possibility of broadcasting digitally encoded audio signals to provide improved audio fidelity. Several approaches have been suggested. One such approach, set forth in U.S. Pat. No. 5,588,022, which is hereby incorporated by reference, teaches a method for simultaneously broadcasting analog and digital signals in a standard AM broadcasting channel. An amplitude modulated radio frequency signal having a first frequency spectrum is broadcast. The amplitude modulated radio frequency signal includes a first carrier modulated by an analog program signal. Simultaneously, a plurality of digitally modulated carrier signals are broadcast within a bandwidth which encompasses the first frequency spectrum. Each of the digitally modulated carrier signals is modulated by a portion of a digital program signal. A first group of the digitally modulated carrier signals lies within the first frequency spectrum and is modulated in quadrature with the first carrier signal. Second and third groups of the digitally modulated carrier signals lie outside of the first frequency spectrum and are modulated both in-phase and in-quadrature with the first carrier signal.

The waveform in the AM compatible digital audio broadcasting system described in U.S. Pat. No. 5,588,022, was formulated to provide sufficient data throughput for the digital signal while avoiding crosstalk into the analog AM channel. Multiple carriers are employed by means of orthogonal frequency division multiplexing (OFDM) to bear the communicated information.

Digital audio broadcasting systems can transmit the digital information using various audio encoding and forward error correction rates to allow a broadcaster to trade-off audio quality for coverage area and resistance to channel impairments. The signals are subject to rapid changes in magnitude and phase. Training sequences can be used in systems such as AM In-Band On-Channel Hybrid digital audio broadcasting systems to allow a receiver to rapidly adapt to changes in the magnitude and phase of the received signal. In such systems there is a need for the receiver to identify when a training baud is received so that it can be properly processed. Such identification must be achieved even in the presence of high level interferers. This invention provides a novel method of identifying the reception of a training baud which is particularly applicable to digital audio broadcasting systems.

SUMMARY OF THE INVENTION

The present invention provides a method for identifying training information in a digital audio broadcasting signal. The method includes the steps of receiving a plurality of carrier signals modulated by a plurality of data baud, wherein the data baud includes normal baud and training baud. The data baud received on a plurality of carrier signals are compared with predetermined data signals to produce a plurality of difference signals. The difference signals are used to produce a plurality of distance signals, which are combined to produce a plurality of group distance signals. One of the group distance signals is selected and used to determine if the data baud corresponding to the selected group distance signal is a training baud or a normal baud. This determination is performed by storing successive selected group distance signals until at least one training baud has been received, and using one of the stored group distance signals to determine normal/training synchronization. The group distance signals correspond to data baud on predetermined groups of the carriers.

The invention also encompasses radio frequency receivers, which utilize the above method.

BRIEF DESCRIPTION OF THE DRAWINGS

The invention will be more readily apparent to those skilled in the art by reference to the accompanying drawings wherein.

DETAILED DESCRIPTION OF THE PREFERRED EMBODIMENTS

This invention provides a method for identifying training information in a digital audio broadcasting signal. The technique of broadcasting the digital signal in the same channel as an analog AM signal is called in-band on-channel (IBOC) broadcasting. This broadcasting is accomplished by transmitting a digital waveform by way of a plurality of orthogonal frequency division modulated (OFDM) carriers, some of which are modulated in-quadrature with the analog AM signal and are positioned within the spectral region where the standard AM broadcasting signal has significant energy. The remaining digital carriers are modulated both in-phase and in-quadrature with the analog AM signal and are positioned in the same channel as the analog AM signal, but in spectral regions where the analog AM signal does not have significant energy. In the United States, the emissions of AM broadcasting stations are restricted in accordance with Federal Communications Commission (FCC) regulations to lie within a signal level mask defined such that: emissions 10.2 kHz to 20 kHz removed from the analog carrier must be attenuated at least 25 dB below the unmodulated analog carrier level, emissions 20 kHz to 30 kHz removed from the analog carrier must be attenuated at least 35 dB below the unmodulated analog carrier level, and emissions 30 kHz to 60 kHz removed from the analog carrier must be attenuated at least [35 dB+1 dB/kHz] below the unmodulated analog carrier level.

Figure 1:
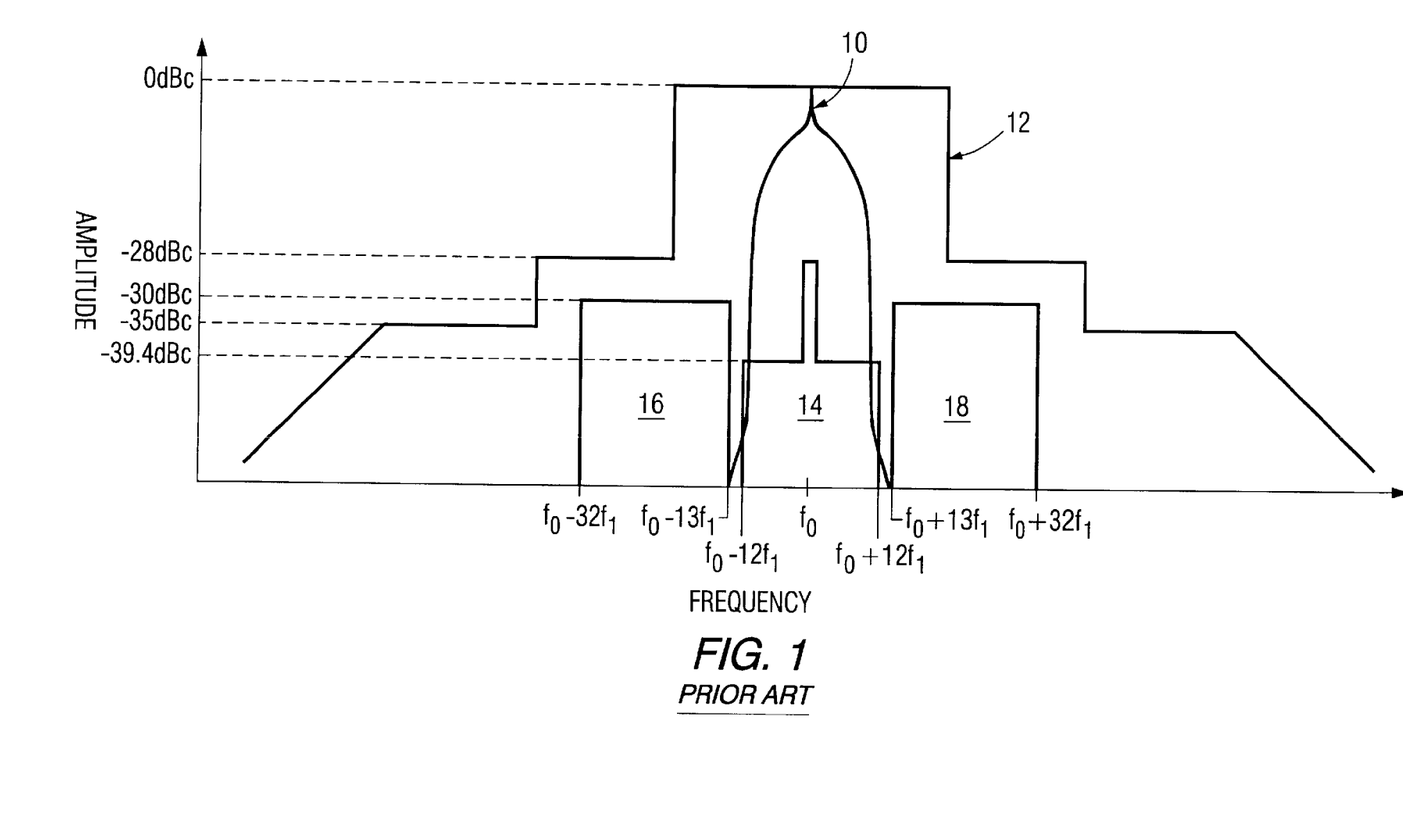
FIG. 1 is a diagrammatic representation of a prior art composite analog AM and digital broadcasting signal which can be utilized when performing the method of the present invention.

FIG. 1 shows the spectrum of an AM digital audio broadcasting signal of a type which can be utilized by the present invention. Curve 10 represents the magnitude spectrum of a standard broadcasting amplitude modulated signal, wherein the carrier has a frequency of $f_0$. The FCC emissions mask is represented by item number 12. The OFDM waveform is composed of a series of data carriers spaced at $f_1 = 59.535 \cdot 10^6/(131072)$, or about 454 Hz. A first group of twenty four of the digitally modulated carriers are positioned within a frequency band extending from $(f_0 - 12 f_1)$ to $(f_0 + 12 f_1)$, as illustrated by the envelope labeled 14 in FIG. 1. Most of these signals are placed 39.4 dB lower than the level of the unmodulated AM carrier signal in order to minimize crosstalk with the analog AM signal. Crosstalk is further reduced by encoding this digital information in a manner that guarantees orthogonality with the analog AM waveform. This type of encoding is called complementary encoding (i.e. complementary BPSK, complementary QPSK, or complementary 32 QAM) and is more fully described in U.S. Pat. No. 5,859,876. Complementary BPSK modulation is employed on the innermost digital carrier pair at $f_0 \pm f_1$ to transmit control information. These carriers are set at a level of −28 dBc. All other carriers in this first group have a level of −39.4 dBc and are modulated using complementary 32 QAM for the 48 and 32 kbps encoding rates. Complementary 8 PSK modulation is used on carriers ranging from $(f_0 - 11 f_1)$ to $(f_0 - 2 f_1)$ and from $(f_0 + 2 f_1)$ to $(f_0 + 11 f_1)$ for the 16 kbps encoding rate. For all three encoding rates, the carriers at $(f_0 - 12 f_1)$ and $(f_0 + 12 f_1)$ carry supplementary data and may be modulated using complementary 32 QAM.

Additional groups of digital carriers are placed outside the first group. The need for these digital waveforms to be in-quadrature with the analog signal is eliminated by restricting the analog AM signal bandwidth. The carriers in a second and a third group, encompassed by envelopes 16 and 18 respectively, may be modulated using, for example, 32 QAM for the 48 and 32 kbps rates, and 8 PSK for the 16 kbps rate. The carriers are set at levels of −30 dBc for all encoding rates.

Information is transmitted using a plurality of baud. In one embodiment, one of every 10 baud is used to periodically transmit known information on all of the digital carriers except those that are used to transmit system control information and supplementary data information. The baud used to transmit the known information are called training baud and the other baud are called normal baud.

Figure 2:
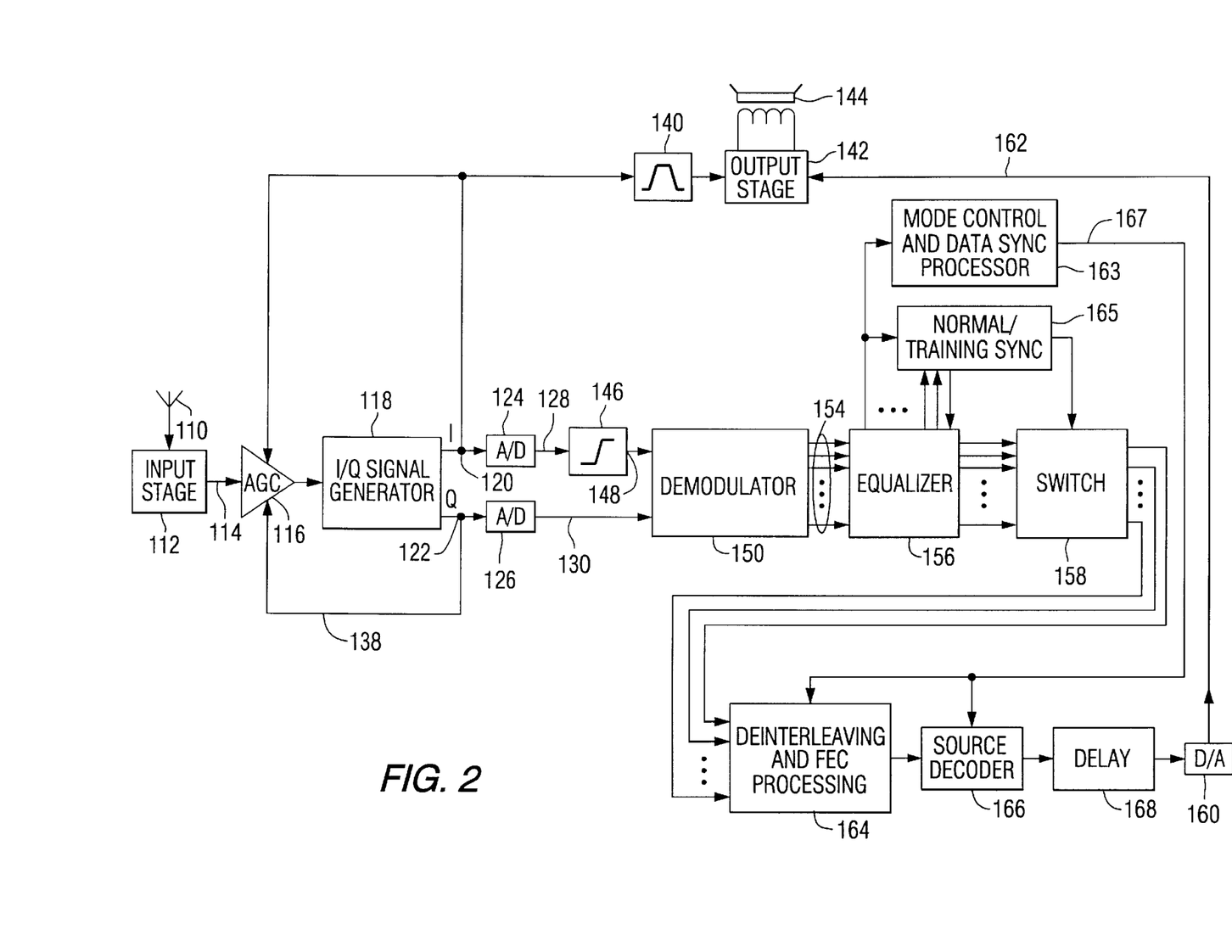
FIG. 2 is a block diagram of a receiver, which can perform the signal processing method of this invention.

FIG. 2 is a block diagram of a receiver constructed to receive the composite digital and analog signals of FIG. 1. An antenna 110 receives the composite waveform containing the digital and analog signals and passes the signal to conventional input stages 112, which may include a radio frequency preselector, an amplifier, a mixer and a local oscillator. An intermediate frequency signal is produced by the input stages on line 114. This intermediate frequency signal is passed through an automatic gain control circuit 116 to an I/Q signal generator 118. The I/Q signal generator produces an in-phase signal on line 120 and a quadrature signal on line 122. The in-phase channel output on line 120 is input to an analog-to-digital converter 124. Similarly, the quadrature channel output on line 122 is input to another analog-to-digital converter 126. Feedback signals on lines 120 and 122 are used to control the automatic gain control circuit 116. The signal on line 120 includes the analog AM signal which is separated out as illustrated by block 140 and passed to an output stage 142 and subsequently to a speaker 144 or other output device.

An optional highpass filter 146 may be used to filter the in-phase components on line 128 to eliminate the energy of the analog AM signal and to provide a filtered signal on line 148. If the highpass filter is not used, the signal on line 148 is the same as that on line 128. A demodulator 150 receives the digital signals on lines 148 and 130, and produces output signals on lines 154. These output signals are passed to an equalizer 156 and to a switch 158. To obtain higher signal-to-noise ratios (SNR) for the complementary carriers, the FFT outputs for pairs of complementary carriers are combined. The output of the switch is sent to a deinterleaving circuit and forward error correction decoder 164 in order to improve data integrity. The output of the deinterleaver/forward error correcting circuit is passed to a source decoder 166. The output of the source decoder is delayed by circuit 168 to compensate for the delay of the analog signal at the transmitter and to time align analog and digital signals at the receiver. The output of delay circuit 168 is converted to an analog signal by a digital-to-analog converter 160 to produce a signal on 162 which goes to the output stage 142. Additional control features are provided by a mode control and data synchronization processor 163 and a normal/training synchronization block 165. Mode control and data synchronization processor 163 processes the control information and determines the audio encoding rate and the boundaries of the inner interleaver. Normal/training synchronization block 165 determines if the received baud is a normal baud or a training baud.

Figure 3:
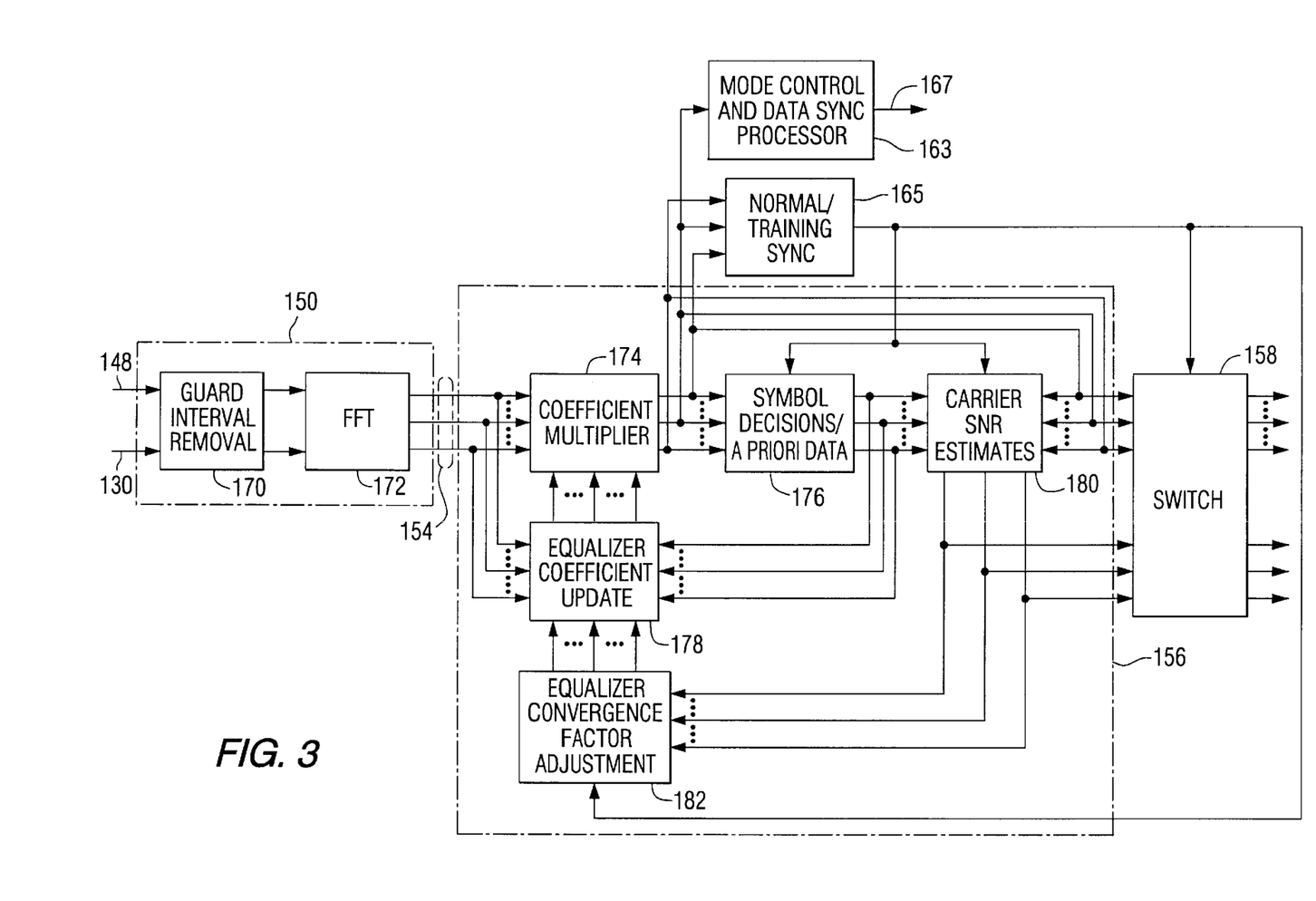
FIG. 3 is a more detailed block diagram illustrating a portion of the receiver of FIG. 2 used to practice the invention.

FIG. 3 is a more detailed functional block diagram which further illustrates the operation of the invention. Both in-phase (I) and quadrature (Q) signals are provided on lines 148 and 130 as inputs to a windowing and guard interval removal circuit 170. These signals may be provided by using down converter elements similar to those shown in FIG. 2. The window should be applied such that the digital carriers remain orthogonal, or at least the lack of orthogonality among the digital carriers is small enough not to impact system performance. The I and Q signals are synchronized to the transmitted baud intervals and each baud is input to an FFT circuit 172. In some cases it may be advantageous to perform the windowing and guard band removal operations prior to processing by highpass filter 146. The outputs from the windowing and guard interval removal circuit 170 are input to the FFT 172. The output of the FFT is input by way of lines 154 to the coefficient multiplier 174. The coefficient multiplier adjusts the magnitude and phase of the data for each digital carrier to compensate for channel effects, transmitter and receiver filtering, and other factors that can affect the magnitude and phase of the received digital information. The coefficient multiplier output is used to make symbol decisions. Processor 176 determines which of the frequency domain constellation points was transmitted. These decisions, along with the pre-equalized constellation points and the previous values of the equalizer coefficients are used to update the equalizer coefficients as illustrated by block 178. Block 178 can utilize a known algorithm such as the least mean squares (LMS) or recursive least squares (RLS) to update the equalizer coefficients.

In order to properly demodulate the data, the receiver must identify when training baud are received. When a training baud is received, the output of the equalizer is not input to the symbol decision processors (including FEC and deinterleavers) because the training baud information is not used to obtain the digitally encoded audio program. Also, the equalizer uses a different convergence factor, or adaptation constant when a training frame is received. Additionally, the data that is input to the noise power estimate is processed differently when a training baud is received. Also, the symbol decisions/a priori data block 176 outputs the ideal data corresponding to the training baud when a training baud is received and the symbol decisions when a normal baud is received. In addition, when a training baud is received, the carrier SNR estimates from processor 180 are not sent through switch 158 and to the deinterleaving and error correction circuit 164 because the carrier SNR estimates for the training baud are not used by the deinterleaving and FEC circuit.

Figure 4:
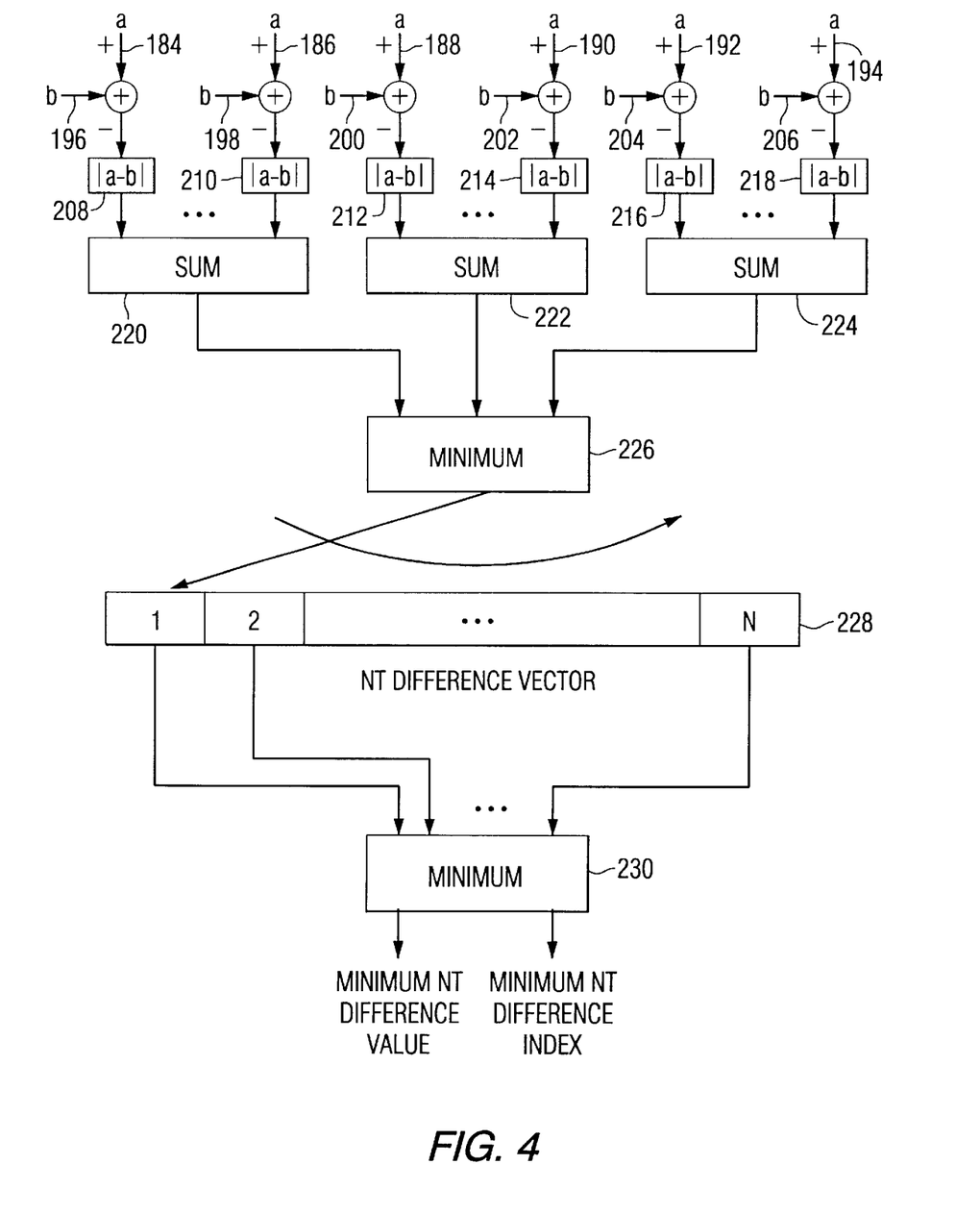
FIG. 4 is diagram illustrating a portion of the normal/training synchronization processing of the present invention.
Figure 5:
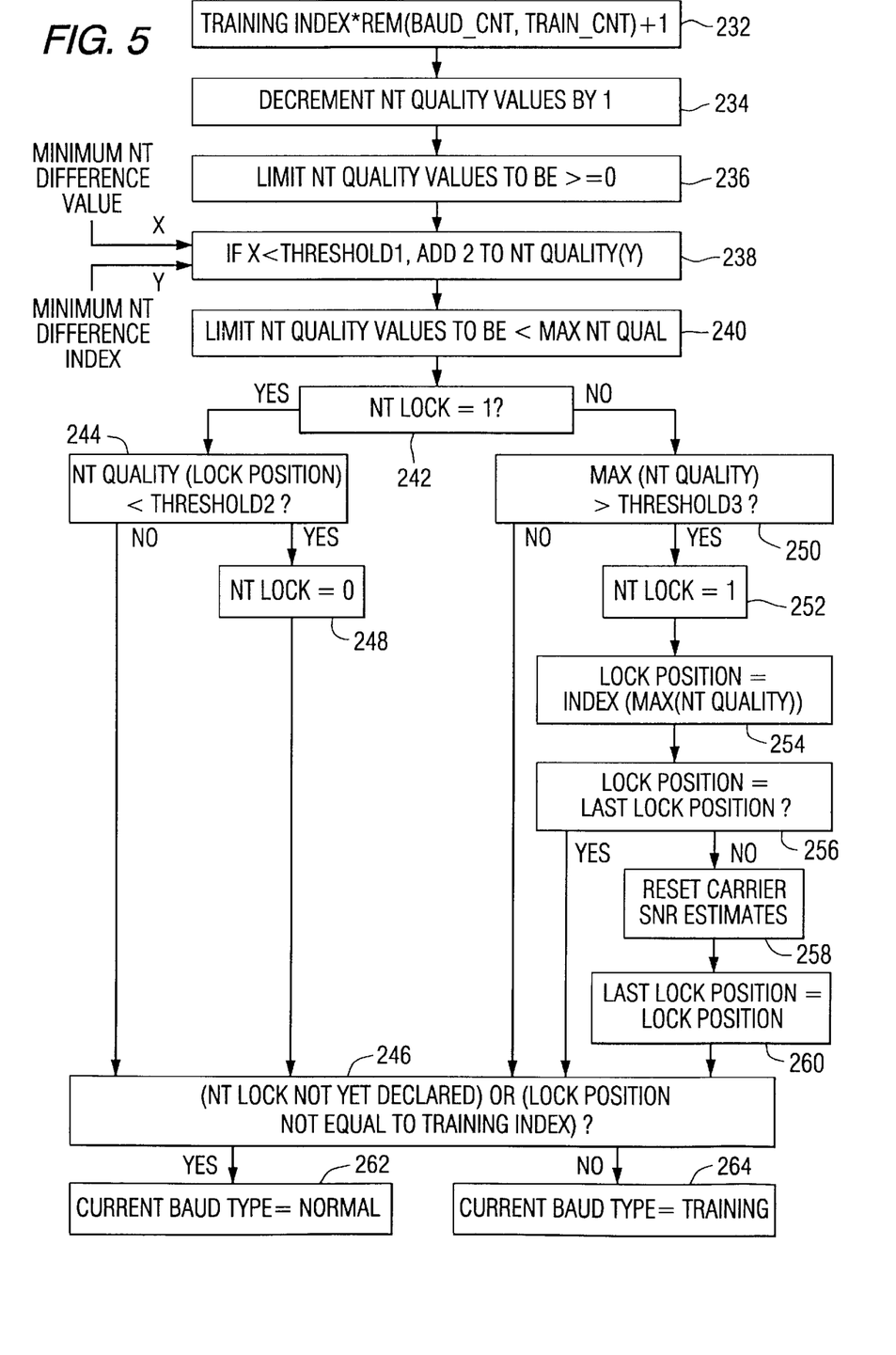
FIG. 5 is a flow diagram showing a portion of the normal/training synchronization algorithm.

As shown in FIG. 3, the coefficient multiplier output is input to a processor 165 that determines normal training synchronization. FIGS. 4 and 5 show the processing that is implemented to achieve normal/training baud synchronization. The processing in each of these figures is described below.

FIG. 4 shows that the distance between the known training sequence data and the equalizer output point is calculated for each carrier that transmits training sequence data. The calculation is performed once every received baud. Data from the equalizer for each carrier is input on a plurality of lines represented by lines 184, 186, 188, 190, 192 and 194. Known training sequence data is supplied as illustrated by lines 196, 198, 200, 202, 204 and 206. A distance measure is calculated by a vector subtraction of the two-dimensional components followed by an absolute value operation shown in blocks 208, 210, 212, 214, 216 and 218. The absolute value operation is achieved by taking the square root of the sum of the squares of the two vector components. As shown in blocks 220, 222 and 224 of FIG. 4, the distances from three groups of carriers are summed. If the three groups of carriers do not contain an equal number of carriers, the average of the distances can be calculated instead of the sum. The groups of carriers correspond to three contiguous 10 kHz regions from the 30 kHz digital audio broadcasting signal bandwidth. A first group of carriers are in the frequency region extending −15 to −5 kHz from the AM carrier frequency, where the AM carrier frequency is at the center of the channel. A second group of carriers are in the region from −5 to 5 kHz from the AM carrier frequency, and a third group of carriers are in the region from 5 to 15 kHz from the AM carrier frequency. Grouping carriers into these three regions permits recognition of the training sequence even if strong interferers are present. This occurs because the interference from an interferer is localized in frequency and only the 10 kHz group with the least summed constellation distance from the training sequence is used to determine if a training sequence has been received. As will be explained, even with strong interferers present in two of the three 10 kHz regions, training sequence synchronization can be achieved.

Following summation of the distances in the three 10 kHz regions, the minimum of the three values is selected as shown in block 226. The minimum value is stored in a normal/training (NT) Difference vector 228. The position in which the value is written into the NT Difference vector is controlled by the Training Index variable of FIG. 5. The length of this vector is equal to the number of baud that are transmitted such that one of the baud is a training baud. For example, if every tenth baud is a training baud, then the length of the NT Difference vector is 10.

Ideally, the position in the NT Difference vector that corresponds to a received training baud will have the minimum value. As shown in block 230 of FIG. 4, the minimum of the NT Difference vector is selected, along with the index of the position where the minimum occurs. This information is used in the NT synchronization algorithm flow chart shown in FIG. 5.

As shown in FIG. 5, the first step 232 in the NT synchronization processing is to update a variable called training index. When the receiver is in NT synchronization, the NT Lock is equal to 1 and the receiver has determined which frames are training frames and which frames are normal frames. The training index is set equal to rem(baud_cnt, train_cnt)+1, where rem(x,y) is x modulo y, baud_cnt is the number of baud received, and train_cnt is equal to the length of the NT Difference vector. Next, block 234 shows that all values in a vector called NT Quality are decremented by one. The values in NT Quality can be initialized to zero. The length of this vector is equal to the length of the NT Difference vector. The value in a particular position of this vector represents the likelihood that a training baud is being received at the time that corresponds to the position. Following decrementing of the values in the vector, the values are limited to be greater than or equal to zero as shown in block 236. Next the minimum NT Difference value and minimum NT Difference index are used. Block 238 shows that if the minimum NT Difference value is less than a preset variable called Threshold1, then the value of NT Quality in the position of the minimum NT Difference index is incremented by two. Next the values of NT Quality are limited to be less than a preset maximum value as shown in block 240. Limiting the value of NT Quality prevents long re-acquisition times in the event that NT synchronization is lost after being locked for a long time. The next block 242 shows a branch that is dependent on whether the receiver is in NT synchronization, which is denoted by setting the value of NT Lock equal to one. If the receiver has achieved NT synchronization, the value of NT Quality corresponding to the lock position is compared to a preset variable called Threshold2 as shown in block 244. If the value of NT Quality for the lock position is not less than the threshold, this indicates a reliable estimate of the training sequence has been obtained and the determination on whether the current baud is a normal or training baud is made. This determination is made in block 246 using an operation as described below. As shown in block 248 of FIG. 5, if the receiver is in NT synchronization (indicated by NT Lock=1) and the value of NT Quality for the lock position is less than Threshold2, this indicates that the receiver has lost NT synchronization. In this event, the value of NT Lock is set to 0 and the determination of whether the current baud is a normal or training baud is made. If the receiver is not in NT synchronization, the maximum value of NT Quality vector is compared to a preset variable called Threshold3 as shown in block 250. The value of Threshold3 can be set greater than the value of Threshold2 to provide hysteresis for the setting of NT Lock. If the maximum value of NT Quality is not greater than Threshold3, indicating that a reliable determination of NT synchronization cannot be made, NT synchronization is not declared and the determination of whether the current baud is a normal or training baud is made. If the maximum value of NT Quality is greater than Threshold3, the value of NT Lock is set equal to one as shown in block 252. Then the value of Lock Position is set equal to the index of the maximum value of NT Quality in block 254. Next, as shown in block 256 if the value of Lock Position is equal to the Last Lock Position, this indicates that the receiver was in NT synchronization, lost synchronization, but reacquired at the same position. In this case a determination of whether the current baud is a normal or training baud is made. If the value of Lock Position is not equal to the value of Last Lock Position, this indicates that either the receiver has first achieved NT synchronization or that the receiver lost NT synchronization and reacquired in a different position. In either of these cases the carrier SNR estimates are reset in block 258, Last Lock Position is set equal to Lock Position in block 260, and a determination of whether the current baud is a normal or training baud is made. The value of the carrier SNR estimates are reset to allow the carrier SNR values to adapt rapidly based only the carrier SNR estimates that are generated after NT synchronization is obtained. The value of Last Lock Position can be initialized to a value that is not an index of the NT Quality vector so that when NT synchronization is obtained for the first time the carrier SNR estimates get reset.

As can be seen from FIG. 5, all paths of the algorithm lead to the point where the current baud is determined to be either a normal or training baud as shown in blocks 262 and 264. If NT synchronization has not been declared or if NT synchronization has been declared at least once, but the Lock Position is not equal to the Training Index, the baud is determined to be a normal baud. If NT synchronization has been declared at least once and the Lock Position is equal to the Training Index, the current baud is determined to be a training baud. Note that if the receiver obtains NT synchronization and then loses it, the position of the training baud is not changed unless the receiver reacquires synchronization in a different position. As mentioned above, other parts of the receiver processing use the current baud type determination to determine how to process the current baud. The symbol decisions/a priori data outputs symbol decisions for normal baud or the data corresponding to the training sequence for training baud. The carrier SNR estimates form separate estimates for the normal and training baud. The data from the coefficient multiplier and the carrier SNR estimates are not passed on the deinterleaving and FEC circuit for training baud. Also, the equalizer convergence factors, which determine how fast the equalizer adapts to changes in the propagation channel, are different for normal and training baud. Additionally, the carrier SNR estimates can be used in the error correction processing to obtain enhanced performance.

This invention provides a method and apparatus for identifying a training sequence in an amplitude modulated compatible digital audio broadcast signal. Identification of the training baud could be performed by correlating the received time domain signal with the known time domain signal corresponding to training baud. However, when interference levels are high, the correlation may not produce results that enable reliable determination of when training baud are received. This invention describes a method to reliably determine when training baud are received, even in the presence of high level interference, if the interference is spectrally localized. The distance between the received frequency domain constellation point and the known frequency domain constellation point corresponding to the training baud is calculated for each OFDM carrier. Then the distances are summed for certain groups of OFDM carriers. Only the group of carriers with the least total distance is used for further processing. Therefore, even if all but one group of carriers are in the presence of high level interference, reliable identification of when training baud are received can be obtained. The groups of carriers can be chosen based on expected interference scenarios. For example, for the AM digital audio broadcasting system with a spectrum as shown in FIG. 1, three contiguous groups of carriers with a bandwidth of 10 kHz can be chosen. If an interfering signal has a spectrum with a center frequency that is offset by 10 kHz from the desired signal, the interference will be high in two contiguous groups of carriers for the desired signal, but the third group of carriers will not experience the same degree of interference. If an interfering signal has a spectrum with a center frequency that is offset by 20 kHz from the desired signal, only one group of carriers for the desired signal will experience interference from the interfering signal. In the foregoing specification certain preferred practices and embodiments of this invention have been set out, however, it will be understood that the invention may be otherwise embodied within the scope of the following claims.

What is claimed is:

1. A method for identifying a training baud in a digital audio broadcasting signal, said method comprising the steps of:
   receiving a plurality of carrier signals modulated by a plurality of data baud, said data baud including normal baud and training baud;
   comparing said data baud received on said plurality of carrier signals with predetermined data signals to produce a plurality of difference signals;
   using said plurality of difference signals to produce a plurality of distance signals;
   combining selected ones of said plurality of distance signals to produce a plurality of group distance signals;
   selecting one of said group distance signals;
   processing the selected group distance signal to determine if the data baud corresponding to the selected group distance signal is one of said training baud or one of said normal baud.

2. The method of claim 1, wherein said processing step includes the steps of:
   storing successive selected group distance signals until at least one training baud has been received; and
   using the stored group distance signals to determine normal/training synchronization.

3. The method of claim 1, wherein the step of selecting one of the group distance signals comprises the step of:
   identifying the smallest one of said group distance signals.

4. The method of claim 1, wherein said plurality of group distance signals correspond to carrier signals lying in contiguous frequency bands.

5. The method of claim 4, wherein said frequency bands are each about 10 kHz wide.

6. The method of claim 1, wherein the step of comparing said data baud received on said plurality of carrier signals with predetermined data signals to produce a plurality of difference signals comprises the step of:
   subtracting said predetermined data signals from each of said data baud to produce said plurality of difference signals.

7. The method of claim 1, wherein said step of using said plurality of difference signals to produce a plurality of distance signals comprises the step of:
   taking the square root of the sum of the squares of vector components of said difference signals.

8. The method of claim 1, wherein said step of combining selected ones of said plurality of distance signals to produce a plurality of group distance signals comprises the step of:
   summing said distance signals.

9. The method of claim 1, wherein said step of combining selected ones of said plurality of distance signals to produce a plurality of group distance signals comprises the step of:
   averaging said distance signals.

10. An apparatus for identifying a training baud in a digital audio broadcasting signal comprising:
    means for receiving a plurality of carrier signals modulated by a plurality of data baud, said data baud including normal baud and training baud;
    means for comparing said data baud received on said plurality of carrier signals with predetermined data signals to produce a plurality of difference signals;

means for using said plurality of difference signals to produce a plurality of distance signals;

means for combining selected ones of said plurality of distance signals to produce a plurality of group distance signals;

means for selecting one of said group distance signals;

means for processing the selected group distance signal to determine if the data baud corresponding to the selected group distance signal is one of said training baud or one of said normal baud.

11. The apparatus of claim 10, wherein said means for processing includes:

means for storing successive selected group distance signals until at least one training baud has been received; and means for using the stored group distance signals to determine normal/training synchronization.

12. The apparatus of claim 10, wherein the means for selecting one of the plurality of group distance signals comprises:

means for identifying the smallest one of said group distance signals.

13. The apparatus of claim 10, wherein said plurality of groups of said distance signals correspond to carrier signals lying in contiguous frequency bands.

14. The apparatus of claim 13, wherein said frequency bands are each about 10 kHz wide.

15. The apparatus of claim 10, wherein the means for comparing said data baud received on said plurality of carrier signals with predetermined data signals to produce a plurality of difference signals comprises:

means for subtracting said predetermined data signals from each of said data baud to produce said plurality of difference signals.

16. The apparatus of claim 10, wherein the means for using said plurality of difference signals to produce a plurality of distance signals comprises:

means for taking the square root of the sum of the squares of vector components of said difference signals.

17. The apparatus of claim 10, wherein said means for combining selected ones of said plurality of distance signals to produce a plurality of group distance signals comprises:

means for summing said distance signals.

18. The apparatus of claim 10, wherein said means for combining selected ones of said plurality of distance signals to produce a plurality of group distance signals comprises:

means for averaging said distance signals.

* * * * *

UNITED STATES PATENT AND TRADEMARK OFFICE
CERTIFICATE OF CORRECTION

PATENT NO.     : 6,400,758 B1
DATED          : June 4, 2002
INVENTOR(S)    : Don Roy Goldston and Marcus Matherne It is certified that error appears in the above-identified patent and that said Letters Patent is hereby corrected as shown below:

Column 3,
Line 20, "$(f_0 11 f_1)$" should read -- $(f_0 - 11 f_1)$ --.

Signed and Sealed this

Twelfth Day of October, 2004

JON W. DUDAS
*Director of the United States Patent and Trademark Office*